3,460,412
TOOL-CHANGING DEVICES FOR MACHINE TOOLS

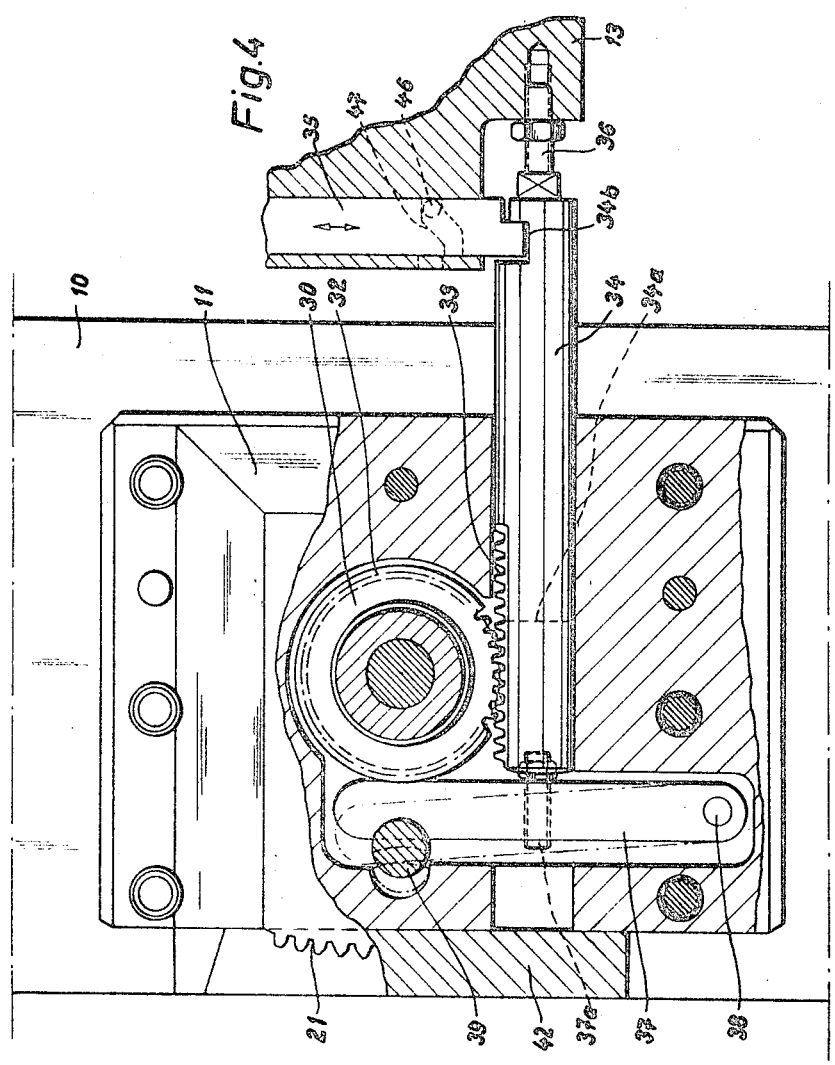

Rolf Clausen and Günter Kleimenhagen, Hamburg, and Ernst Saljé, Bendestorf, Germany, assignors to Heidenreich & Harbeck, Hamburg, Germany, a corporation of Germany
Filed Sept. 19, 1966, Ser. No. 580,256
Claims priority, application Germany, Sept. 22, 1965, H 57,229
Int. Cl. B23b *3/00, 7/00, 9/00*
U.S. Cl. 82—2        6 Claims

ABSTRACT OF THE DISCLOSURE

A tool-changing apparatus for machine tools and more particularly lathes in which a part carrying a tool post for a tool holder is displaceable on a guide, with a separately arranged magazine having a movable storage part adjustable according to a predetermined program with a plurality of detachably mounted tool holders for the storage part and with each of the tool holders being removable from or replaceable in the appropriate position in the magazine by a displacement in the direction in which the part is guided and the tool holder in the course of relative movement between the part and the storage part of the magazine capable of being lifted from the tool post are placed thereon and the tool holder and tool post including complemental interengaging teeth for locating the tool holder on the tool post.

---

Figure 1:
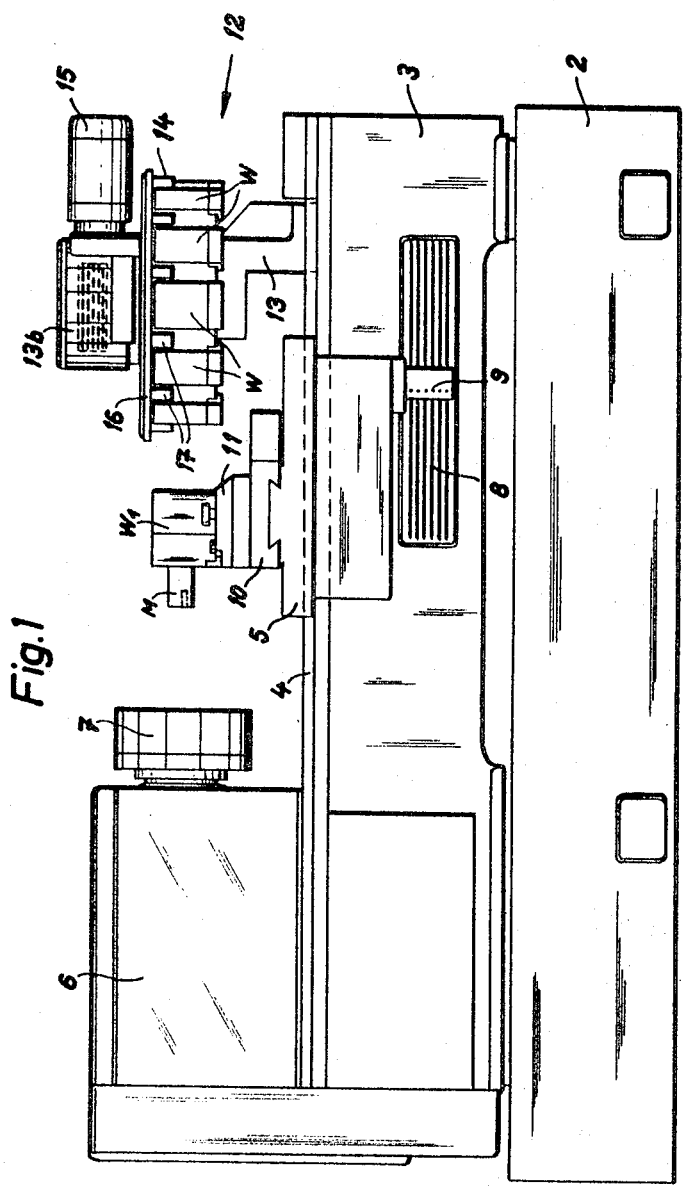

The invention relates to a tool-changing apparatus for machine tools, particularly lathes, in which a part (slide, saddle or the like), carrying a tool post for a tool holder, is displaceable on a guide, with a separately arranged magazine which contains a movable storage part, adjustable according to a predetermined programme, which has a number of detachably mounted tool holders.

Various proposals have been made in order to simplify the tool change with a machine tool, or to carry it out automatically. Thus a magazine is normally used, which can accommodate a number of tool holders similar to one another, in which the tools are clamped in a preset position or fixed in another manner.

It is the object of the invention to provide a tool-changing apparatus of the above-named type, which is relatively easy to construct, only necessitates a few uncomplicated moving processes for carrying out the tool change and reduces the working and operating space on the machine to as little as possible.

For this purpose, the invention provides that the arrangement and construction of the magazine are such that through the displacement, of a part carrying the tool post and/or of the magazine, in the guide direction of this part, each tool holder can be removed from or put back into the magazine storage part belonging thereto, the tool holders in the movable storage part of the magazine being in the end position of the tool post, movable over this tool post.

Thus the tool change can be effected in a very simple manner. Concerning the movements, besides the always necessary feed motion of the storage part of the magazine, merely the transporting of the tool post into the magazine and out of it is necessary. As regards the positioning of the magazine on the machine, there are accordingly, many possibilities, so that various requirements can be taken into account and an undesired use of valuable space can be substantially avoided. With a normal turning lathe the magazine can be arranged on the opposite side of the bed slide to the work space, so that the bed slide is thus positioned between the spindlestock and magazine, and for the tool change there takes place a movement of the bed slide and/or of the magazine in the direction of the guide for the bed slide.

The magazine can be fixed on the machine. It can however also be equipped with a detachable or adjustable fixing attachment, rather in the form of a bridge or the like which is displaceable on the tool holder guide or a guide parallel thereto. This offers the advantage that the magazine can be brought into the most suitable position for the machining process under consideration, in order to keep, for example, the path covered for the tool changing particularly small. In a predetermined programme or with a numerical control, the required associated end position of the tool post in the tool change can easily be taken into account.

Furthermore, the magazine can also be provided with a drivable slide or the like, which slides on an existing guide or on another guide parallel thereto, e.g., in the longitudinal direction of a bed. The movement in the direction of the guide, with the tool change, can then be divided between the bed slide and magazine slide.

The storage part of the magazine can have different forms and can be constructed as a rotatable drum, frame, star or as a displaceable holder, slide or the like. An advantageous embodiment consists in the fact that the storage part is rotatable around an axis which is perpendicular to the plane of movement of the tool post, or is displaceable parallel to this plane.

For the placing of the tool holder in a fixed position on its tool post, the invention in particular provides that the tool post has a mechanical chuck for the tool holder, which can be automatically released on moving into the end position on the magazine and on going back can be again attached. This results in an embodiment which is reliable and inexpensive. However, electrical or hydraulic chucking equipment can also be used.

Between the tool holder and tool post, there is advisably, for the adjusting of the position, a form locking engagement which, through the displacing movement of the tool post relative to the magazine, can be automatically disconnected or set up again. Advantageously, a gear tooth system can be used for this purpose, constructed so that a projection, directed downwards, on the front edge of the tool holder, which can serve for taking up large axial forces, is provided with teeth which engage a corresponding gear tooth system a heel of the tool post.

Although with the apparatus according to the invention it is not at all ruled out that for the indexing operation the magazine or its storage part is displaced or raised in a specified direction and afterwards is pushed back or lowered in order to become free of the tool post, the invention offers, however, the advantageous possibility of doing away with such a supplementary movement. In the simplest case, the path of motion of the tool holders positioned in the storage part of the magazine, can lie at the same or nearly the same height as the tool post. All of the tool holders can be, for example, provided with an aperture or groove running parallel to the direction of adjustment of the storage part, while there are provided, on the storage part, drivers operating only in the direction of movement of the storage part, and on the tool post, a driver which engages with the groove and operates only in the direction of displacement of the tool post. If it should prove necessary, guides or supports for the tool holder can be provided, running in the direction of movement of the storage part and connected to the tool post. The driver inside or on the tool post can at the same time be part of a chuck or serve for the adjustment.

According to a further feature of the invention, sloping guide pieces for the lifting or lowering of the toolholder relative to its tool post during the displacement of the latter are provided on the storage part of the magazine and/or on the tool holder. Through this arrangement, there is achieved, without complicated mechanism or additional operation elements, a separation between the tool holder and tool post and after the changing a joining together once again. The separation is, in this case, already effected when the tool post has reached its end position.

Figure 2:
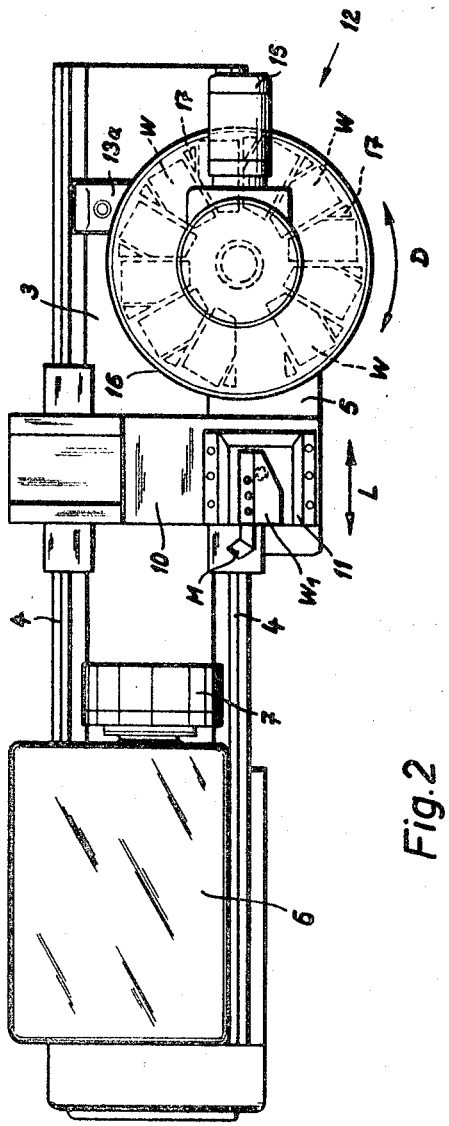
Figure 3:
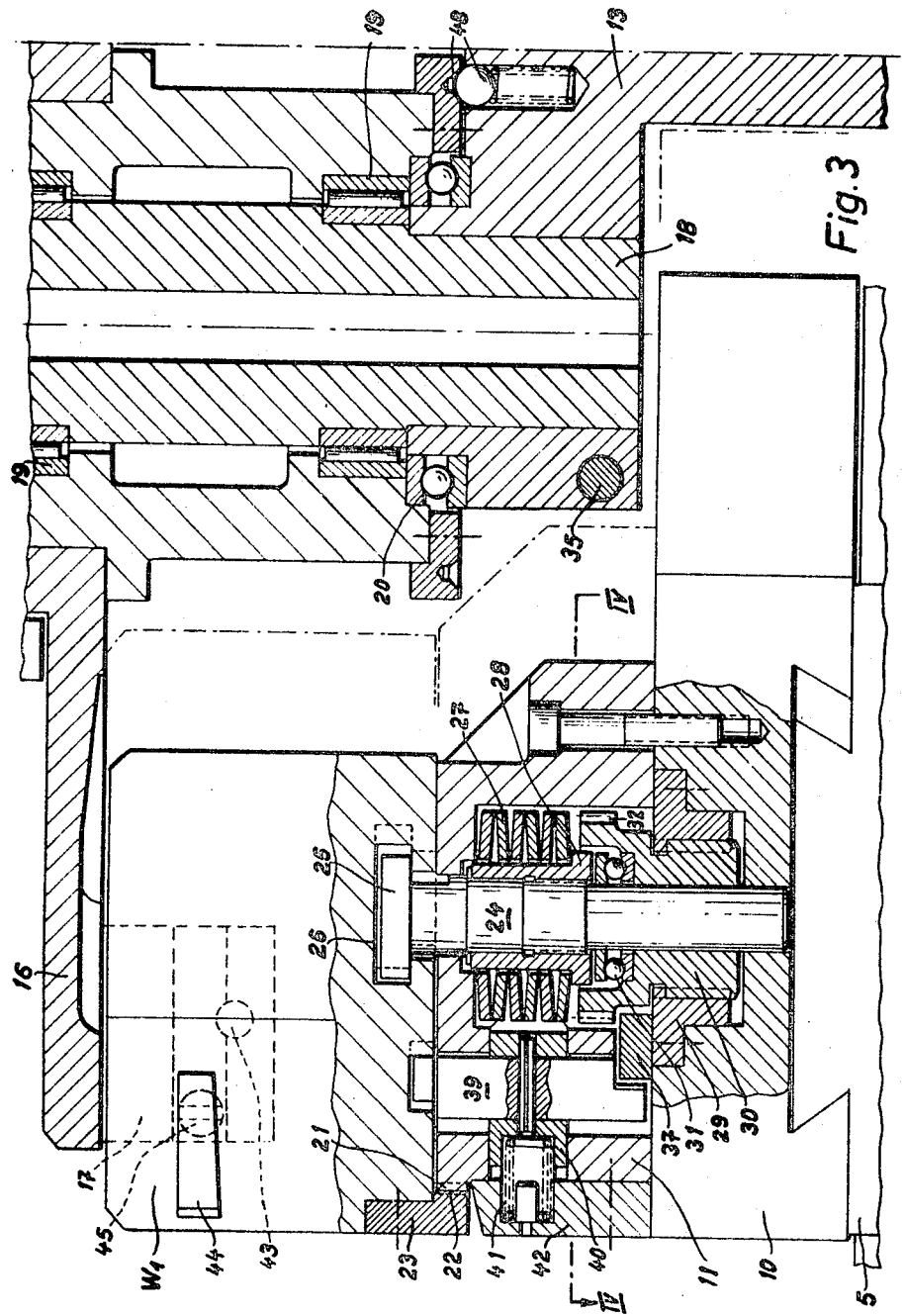

The drawing illustrates a constructional example of the apparatus according to the invention in which:

FIG. 1 is an elevational view of a turning lathe, equipped with the changing apparatus as seen from the operator's side, FIG. 2 is a plan view of FIG. 1, FIG. 3 is a vertical section through a tool holder mounting and magazine, and FIG. 4 is a horizontal section along the line IV—IV in FIG. 3.

In a turning lathe 1 depicted in FIGS. 1 and 2, a bed 3 is fixed on a base 2, and on guides 4 of the bed 3, a bed slide 5 can be displaced by a known method. The main spindle positioned in a headstock 6 carries a chock 7. A zone of cam strips provided on the bed 3 is indicated at 8, with which a feeler or switch means 9 positioned on the bed slide 5 is associated. This belongs to the programme control of the machine, in which also the tool changing is included.

The bed slide 5 is provided with a saddle 10 on which is placed a tool post 11. This carries a tool holder W' with a tool gripped therein e.g., a turning bit M.

A magazine indicated in its entirety at 12, is arranged on the rearward end of the bed, the end opposite to the work space. This magazine contains a stationary part 13 and a rotatable storage part 14 mounted thereon, together with a driving motor 15 for the part 14. The stationary magazine part 13 is fixed to the bed by means of a bridge 13a or the like (FIG. 2). The arrangement can be detachably or adjustable, so that on the one hand the magazine 12 can be taken off from the lathe as desired and can be put back on again, and on the other hand there is the possibility of positioning the magazine in a longitudinal and/or traverse direction of the bed, so that it corresponds completely to the cycle of work being effected.

In the storage part 14, twelve storage places are provided under a head plate 16, and in which places the tool holders W, in this constructional example, are suspended. This is effected by holding pieces 17 fixed to the head plate, which holding pieces have the form of sectors of a circle, and separate the individual storage places. The tool holders W are bevelled in each case on one side, so that the result is a space-saving storage.

As is particularly noticeable in FIG. 2, the areas of movement of the storage part 14 and the tool post 11 carried by the bed slide and the transverse saddle overlap each other, so that the tool post 11, by merely displacing it in the direction indicated by the arrow L, can be directly brought into the magazine for the tool change, and after a corresponding rotation of the storage part in the direction of the arrow D, can be brought out again with a new tool holder.

Details of the apparatus according to the invention can be seen from FIGS. 3 and 4. The stationary part 13 of the magazine contains a column 18 fixed to the base. On the column is positioned the rotatable storage part 14 with the head plate, with the aid of roller bearings 19 and ball bearings 20. The drive for the rotatable storage part is from the motor 15 through a worm drive which is fitted into a magazine upper section 13b (FIG. 1). In the latter there are also switch or control elements in the form of a cam drum provided with feeler elements.

The tool post 11 is fixed onto the saddle 10 of the bed slide 5 with screws. The upper end of the tool post 11 forms the bearing surface for the tool holder W'. In order to put every tool holder always in the same definite position on the post 1, teeth 21 are provided on an offset part of the post, which are engaged by teeth 22 which face rearwardly from a member 23 fixed to the front lower edge of the tool holder and projecting downwards. The unsectioned part of FIG. 4 shows the upper end of the tool post without the tool holder being mounted theron so that the teeth 21 can be seen.

In order to fix the tool holder W' on its post 11 there is an axially displaceable clamp bolt 24, whose head 25 formed by a flange engages with a T-groove 26 in the tool holder. Perpendicular to the plane of the drawing this groove runs in the direction of movement of the storage part 14, i.e., it follows the path of a circle. A plate spring packet 27 is supported by its upper end on an inner surface of the tool post 11 and by its other end on the shoulder of a sleeve 28, which is connected with the clamp bolt 24 to move with it in an axial direction. The spring packet 27 tries to keep the clamp bolt constantly pushed down, whereby the tool holder is kept in place.

In the saddle 10 there is a nut-like insertion 29 provided with an internal thread, inside which nut can be screwed a sleeve 30 provided with a corresponding external thread and encircling the clamp bolt. This sleeve 30 has in its inside, as well, as thrust bearing 31 which is positioned against the lower end of the sleeve 28, when the sleeve 30 moves upwards in the course of a screw movement. In this movement it takes the sleeve 28 with it, so that the spring packet 27 is compressed and thereby the tool holder from the tool post.

The rotating of the sleeve 30 for the attachment or release of the tool holder takes place by means of a rack-and-pinion gear. The sleeve 30 is provided, for this purpose, in its upper section with gear teeth 32, with which engages an actuating bolt 34 formed through a certain length thereof as a toothed rack 33 and displaceable in a longitudinal bore of the tool post 11 (FIG. 4). The bolt 34 projects to the rear beyond the tool post 11, so that with a displacement of the later in the direction of the magazine it strikes against the head of an adjustable stop screw 36 on the lower part of the magazine (FIG. 4).

In the tool post 11 there is further provided a one-armed lever 37 which is pivotable about a pin 38 and beam against the stepped lower end of a pin 39 which is fixed to a guide member 40 (FIG. 3). The latter is displaceable in a horizontal longitudinal bore, against a compression spring 41, which abuts aaginst a cover 42, bolted to the tool post 11. The upper end of the pin 39 engages with an aperture parallel to the T-groove, in the lower end of the tool holder W' and in order to adjust the holder W', pushes the teeth 22 into the gear-teeth 21 of the tool post 11.

A complete tool-changing process takes place as follows. After the finishing of one cut, the saddle 10 with the tool post 11 and the tool holder thereon moves back from the workpiece into a position which lies in line with the empty storage part of the magazine (cf. FIG. 2). The bed slide 5 now moves to the right to the magazine and in the course of this movement also reaches the position shown in FIG. 3. Approximately at this moment, the rearward end of the bolt 34 strikes the stop screw 36 on the lower part 13 of the magazine, so that with further movement of the bed slide, the bolt is now pushed inwards and causes a rotation of the screw sleeve 30. Through this rotation the tool holder is released from the tool post.

The bolt 34 then causes a deflection of the lever as is shown in FIG. 4 in broken lines. This can come about in such a manner that for example the front end of the bolt leans against the lever. The construction corresponding to the illustration is advantageous, in that the bolt 34 has a heel 34a which bears on an adjustable stop screw 37a in the lever 37.

The lever 37, for its part, bears against the pin 39 and moves it. Through this movement the tool holder W' is displaced relative to the tool post 11 in the last stage of the bed slide movement so that the adjusting gear tooth systems 21, 22 come out of engagement. By the programme control or through a limit switch, meanwhile, the bed slide movement has been terminated so that the bed slide 5, saddle 10 and tool post 11 are in the final position indicated in FIG. 3 by broken lines.

During the movement into this final position, moreover, guiding strips 44 (FIG. 3) provided at the side of the tool holder W' and forming inclined planes, have meanwhile come into contact with bolts positioned on the holding pieces 17. Through this contact the tool holder W' has been lifted up so that it no longer rests on the bearing surface of the tool post 11, but is now taken by the holding pieces.

The holding pieces 17 are equipped with spring-loaded bolts 45 which lie in front of the front edges of the guiding strips 44 of the tool holder in the storage part, and secure these strips against forward movement when the storage part is rotated.

The storage part 14 of the magazine can now be rotated by means of its drive, in order to bring up another toolholder selected in the programme control. This can be the nearest one, but it can also be a tool holder in another place in the magazine. In this arrangement the remaining tool holders are moved away over the tool post 11 during the rotation of the storage part. For the individual positionings of the storage part, there is provided a click-stop device 48.

As soon as the storage part 14 has come to rest, the bed slide movement can be actuated by the control in a reverse direction (in the figures, to the left). Thus the new tool holder positioned over the tool post is taken by the tool post and the processes of adjustment, lowering and attachment are carried out in reverse order to that of the movement into the end position. Thus the whole tool change is completed quickly and in a very simple manner.

The bolt 34 can also be fitted on to the magazine in such a way that it is moved into the tool post 11 with the movement of the bed slide into the magazine, and engages with the gear teeth 32 of the sleeve 30. When the bolt remains all of the time in the tool post 11, as in the construction depicted in the drawing, then on the moving out from the end poistion, it is fixed for a short time to the magazine, until the attachment of the tool holder has taken place.

For this purpose a holding bolt 35 is guided displaceably inside the magazine lower part 13, with the front setback end of the bolt 35 being able to engage with an aperture 34b of the bolt 34. For the moving of the bolt 35 out of the operating position, shown in FIG. 4, into a withdrawn resting-position and vice-versa, there is provided, e.g., a solenoid magnet, which can be controlled by the programme or through limit or time switches. Another possibility, i.e., a positive displacement of the bolt 35 depending on the movement of the tool post, is shown in FIG. 4. A pin 46 placed, for example, on the saddle 10 engages, in this arrangement, a groove or recess 47 on the underside of the bolt 35, the side edges of the groove forming cams, in such a way that on the movement of the tool post out of the end position, the bolt 35 still holds the bolt 34 firmly for a specified period. The shape and inclination of the side edges of the recess 47 can be easily selected so that the desired sequence of movements is achieved.

We claim:

1. A tool-changing apparatus for machine tools and more particularly lathes, including a guide, means displaceable on the guide, a tool post for a tool holder part carried by said displaceable means, a separate magazine having a movable storage part adjustable according to a predetermined program, said movable storage part being provided with a plurality of tool holder parts detachably mounted thereon with each tool holder part being removable from or replaceable in the appropriate position in said magazine by a displacement in the direction in which said displaceable means is guided, means on said parts for raising or lowering the tool holder part so that the tool holder part during relative movement between said displaceable means and said storage part is capable of being lifted from or placed upon said tool post, and complemental interengaging teeth on said tool post and tool holder part for locating the tool holder part on said tool post.

2. The tool-changing apparatus as claimed in claim 1 in which inclined guiding strips are provided on one of said storage part or tool holder part and bolt means on the other of said storage part or tool holder part cooperates with said guiding strips for raising or lowering the tool holder part relative to the tool post on displacement of the tool post.

3. The tool-changing apparatus as claimed in claim 1 including a mechanical chuck on the tool post for the tool holder part capable of being automatically released upon moving into the end position in the magazine and capable of again being engaged upon leaving the magazine.

4. The tool-changing apparatus as claimed in claim 1 in which said tool post is provided with a clamp bolt for the tool holder part movable transversely to the engagement direction of the interengaging teeth for locating the tool holder part on the tool post.

5. The tool-changing apparatus as claimed in claim 1 in which said magazine is provided with an adjustable bridge.

6. The tool-changing apparatus as claimed in claim 1 in which said magazine is provided with a drivable slide so that relative movement between the displaceable means and the magazine, required for a tool change, can be executed in at least part by said magazine.

References Cited

UNITED STATES PATENTS 3,186,266    6/1965    Coate _____ 29—568
3,354,761   11/1967    Sadier _____ 82—2

LEONIDAS VLACHOS, Primary Examiner

U.S. Cl. X.R.

29—568; 77—25; 82—34, 36